US007728819B2

(12) United States Patent
    Inokawa

(10) Patent No.: US 7,728,819 B2
(45) Date of Patent: Jun. 1, 2010

(54) INPUT DEVICE, INFORMATION PROCESSING DEVICE, REMOTE CONTROL DEVICE, AND INPUT DEVICE CONTROL METHOD

(75) Inventor: Hiroyuki Inokawa, Tokyo (JP)

(73) Assignee: Sony Corporation, Tokyo (JP)

( * ) Notice: Subject to any disclaimer, the term of this patent is extended or adjusted under 35 U.S.C. 154(b) by 754 days.

(21) Appl. No.: 10/579,497

(22) PCT Filed: Nov. 12, 2004

(86) PCT No.: PCT/JP2004/017224

§ 371 (c)(1),
(2), (4) Date: May 16, 2006

(87) PCT Pub. No.: WO2005/048094

PCT Pub. Date: May 26, 2005

(65) Prior Publication Data

US 2007/0146334 A1    Jun. 28, 2007

(30) Foreign Application Priority Data

Nov. 17, 2003  (JP)  ............................. 2003-386743
Nov. 19, 2003  (JP)  ............................. 2003-389643

(51) Int. Cl.
   *G06F 3/041*   (2006.01)
   *G09G 5/00*    (2006.01)
   *G06F 3/045*   (2006.01)
(52) U.S. Cl. ..................... 345/173; 345/156; 345/169; 178/18.05
(58) Field of Classification Search ................. 345/173, 345/156
See application file for complete search history.

(56) References Cited

U.S. PATENT DOCUMENTS

| 5,666,113 | A  | * | 9/1997  | Logan ......................... 341/34 |
| 6,263,499 | B1 | * | 7/2001  | Nakamura et al. .......... 717/171 |
| 6,788,297 | B2 | * | 9/2004  | Itoh et al. ................... 345/179 |
| 6,894,679 | B2 | * | 5/2005  | Suzuki ....................... 345/169 |
| 7,292,227 | B2 | * | 11/2007 | Fukumoto et al. ........... 345/173 |
| 2002/0057259 | A1 | * | 5/2002 | Suzuki ....................... 345/168 |

(Continued)

FOREIGN PATENT DOCUMENTS

JP          61-118823        6/1986

(Continued)

*Primary Examiner*—Bipin Shalwala
*Assistant Examiner*—Benyam Ketema
(74) *Attorney, Agent, or Firm*—Oblon, Spivak, McClelland, Maier & Neustadt, L.L.P.

(57) ABSTRACT

An input apparatus including a sensor section that confirms whether a pressing or touching operation is performed on a panel's front surface with a detected data value that varies depending on which operation is performed, a position determination process section that generates a control signal corresponding to the detected data value, and a control section that generates a signal waveform of a drive voltage supplied to a drive section to deform the panel with the control signal. When an operator performs a pressing or touching operation, the panel is deformed corresponding to a signal waveform having a first amplitude. If the pressing operation is confirmed, the panel is deformed with a signal waveform having a second amplitude larger than the first amplitude. Thus, an operator feels a stroke sense from the weak vibration after the touching operation and a click sense from the strong vibration after the pressing operation.

18 Claims, 11 Drawing Sheets

U.S. PATENT DOCUMENTS

2002/0149561 A1* 10/2002 Fukumoto et al. ........... 345/156
2004/0021645 A1*  2/2004 Kobayashi et al. .......... 345/173
2005/0046621 A1*  3/2005 Kaikuranta ................. 345/173

FOREIGN PATENT DOCUMENTS

| | | |
|---|---|---|
| JP | 3-78335 | 8/1991 |
| JP | 4-102114 | 4/1992 |
| JP | 4-205613 | 7/1992 |
| JP | 8-221173 | 8/1996 |
| JP | 9-115379 | 5/1997 |
| JP | 10-293644 | 11/1998 |
| JP | 11-162277 | 6/1999 |
| JP | 11-212725 | 8/1999 |
| JP | 2000-137576 | 5/2000 |
| JP | 2000-228131 | 8/2000 |
| JP | 2001-306259 | 11/2001 |
| JP | 2002-149312 | 5/2002 |
| JP | 2002-373540 | 12/2002 |
| JP | 2003-58321 | 2/2003 |
| JP | 2003-272463 | 9/2003 |
| JP | 1764987 A1 * | 9/2006 |

* cited by examiner

Fig. 2
A
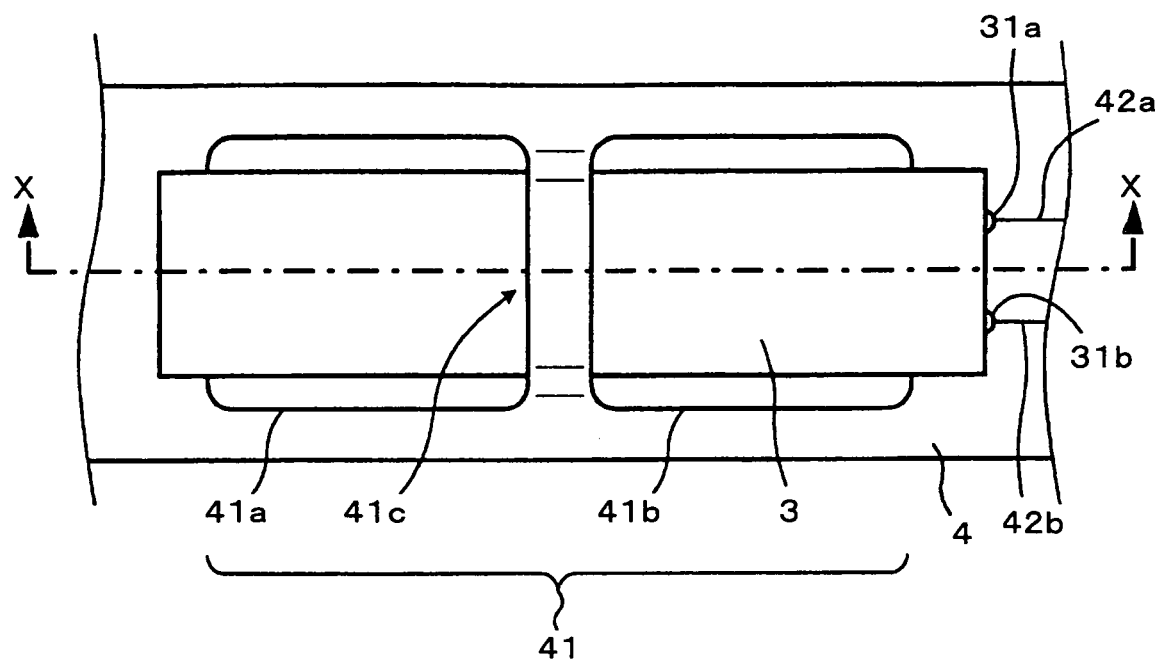
B
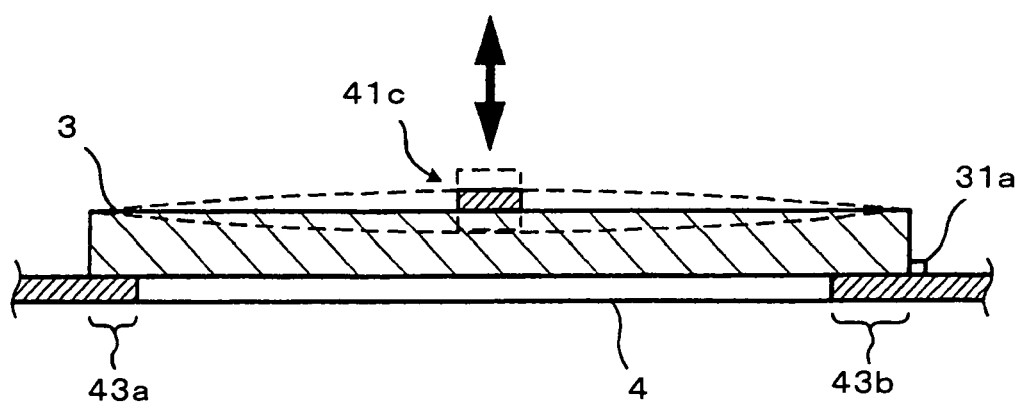

INPUT DEVICE, INFORMATION PROCESSING DEVICE, REMOTE CONTROL DEVICE, AND INPUT DEVICE CONTROL METHOD

TECHNICAL FIELD

The present invention relates to an input apparatus, an information process apparatus, a remote control apparatus, and a control method of the input apparatus, in particular, to an input apparatus that detects whether a pressing operation or a touching operation is being performed on the front surface of a panel and inputs data corresponding to the pressing operation or the touching operation, an information process apparatus that uses the input apparatus, a remote control apparatus that uses the input apparatus, and a control method of the input apparatus.

BACKGROUND ART

Input apparatuses that use a touch panel have been widespread for automatic teller machines in banks, automated ticket vendors for train tickets, commuting passes, and so forth, so-called convenience store terminals used in convenience stores for ticket sales and other services, information process apparatuses such as PDAs (Personal Digital Assistances), and so forth. The touch panel type input apparatus accomplishes a GUI (Graphical Operator Interface) for users of these apparatuses by correlating buttons and icons displayed on a display device such as an LCD (Liquid Crystal Display) with a coordinate system and detecting the position that a finger or a pointing device such as a pen touches on the panel.

With many of these touch panel type input apparatuses unlike normal input apparatuses that use real switch buttons, the operator cannot really feel a click sense. Thus, recent touch panel type input apparatuses generate operation sound such as beep sound and/or change the shape of a display button corresponding to an operator's input operation to acoustically and/or visually inform him or her that the input operation has been performed.

However, when the operator uses such an input apparatus, it may slowly respond to the input operation or may not operate. If the operator mistakes an input operation, he or she becomes anxious about the operability of the input apparatus. Thus, it cannot be said that the conventional touch panel type input apparatuses are easy to operate.

To solve such a problem, a mechanism of which for example a piezoelectric device is disposed immediately above a panel has been proposed. In this mechanism, when the operator performs an input operation, the piezoelectric device causes the panel to deform corresponding to the input operation to feed back a force sense to him or her. Thus, when the operator operates the input apparatus, he or she feels a click sense as if he or she pressed a switch button.

In a conventional apparatus, a resistive film type touch panel is used. In the resistive film type touch panel, a plurality of flexible electrode sheets are layered with a predetermined space so that their electrode surfaces are opposite to each other. In this apparatus, a bobbin coil is fitted to a housing on which the touch panel is secured. This apparatus is disclosed in for example Japanese Patent Application Unexamined Publication No. 2002-259059, paragraphs [0037] to [0040], FIG. 3, FIG. 6, and FIG. 7. In this input apparatus, when the operator presses the touch panel, the electrode sheets contact each other and electricity flows. As a result, the bobbin coil operates and pushes the touch panel back to the operator. Thus, the operator can feel a click sense.

In another proposed input apparatus, a touch panel is supported by a piezoelectric device. An operation force is detected with a voltage that occurs in the piezoelectric device corresponding to a pressing pressure on the touch panel. (This input apparatus is disclosed in for example Japanese Patent Application Unexamined Publication No. HEI 11-212725, paragraphs [0132] to [0143], FIG. 15, FIG. 16). Thus, when the operator presses the touch panel, it does not have a press stroke. However, the operator can feel a click sense.

However, in the conventional touch panel type input apparatuses, when the operator operates the panel, he or she cannot feel a stroke sense. In addition, since the touch panel type input apparatuses generate a click sound, press the panel back to the operator, or vibrate it with a small delay after he or she operates the panel, these input apparatuses cannot clear operator's anxiety about the touch panel. Thus, the touch panel type input apparatuses have not satisfied virtual switches.

Since the operator knows a touch sense of real switches, when he or she presses the panel of such a touch panel type input apparatus, he or she cannot feel a stroke sense. If the operator feels a strong sense on the touch panel after he or she have pressed the panel, he or she may become uncomfortable.

In other words, the touch panel type input apparatuses need to not only give feedback to the operator, but also cause the operator to virtually feel a stroke sense as if he or she pressed a switch button.

The conventional touch panel type input apparatuses deforms the panel and feed back a force sense to the operator regardless of the strength with which the operator presses the panel. In the input apparatuses, the panel is pressed in various manners that depend on the operators. In particular, an operator who is not accustomed to the apparatus tends to strongly press the panel. This is because the feedback from the panel is the same regardless of the manners that the operator presses the panel. The operator does not know a response of the apparatus corresponding to the pressure with which he or she presses the panel. As a result, the operator will have a bad impression about the operability of the touch panel.

When the operator presses the panel, if he or she has feedback, he or she may feel safe against the operation. However, if the operator strongly presses the panel, his or her finger is fatigued. When the operator becomes accustomed to the input operation, he or she can lightly press the panel. However, if the feedback from the panel is constant, it is difficult for the operator to learn to optimally press the panel. In particular, if the operator is not accustomed to the operation of the panel, he or she tends to mistake the operation.

The present invention is made from the foregoing point of view. An object of the present invention is to provide an input apparatus and a control method thereof that allow the operator to virtually feel a stroke when he or she operates the panel.

In addition, an object of the present invention is to provide an information process apparatus and a remote control apparatus that use such an input apparatus.

In addition, an object of the present invention is to provide an input apparatus and a control method thereof that allow the panel to deform corresponding to manners in which the operator operates the panel so as to feed back a force sense to the operator.

In addition, the present invention is to provide an information process apparatus and a remote control apparatus that use such an input apparatus.

DISCLOSURE OF THE INVENTION

To solve the foregoing problem, an input apparatus for performing an input operation as a pressing operation or a touching operation on a front surface of a panel is provided. The input apparatus comprises input detection means for detecting whether the pressing operation or the touching operation is being performed on the front surface of the panel; waveform generation means for generating a signal waveform after the pressing operation or the touching operation is performed when the input detection means detects that the pressing operation or the touching operation is being performed and generating a signal waveform having a larger amplitude after the pressing operation or the touching operation is confirmed than the signal waveform generated after the pressing operation or the touching operation is performed; and panel deforming means for deforming the panel corresponding to the signal waveform generated by the waveform generation means.

In the input apparatus, the input detection means detects whether the pressing operation or the touching operation is being performed on the front surface of the panel. The waveform generation means generates a signal waveform after the pressing operation or the touching operation is performed when the input detection means detects that the pressing operation or the touching operation is being performed and generates a signal waveform having a larger amplitude after the pressing operation or the touching operation is confirmed than the signal waveform generated after the pressing operation or the touching operation is performed. The panel deforming means deforms the panel corresponding to the signal waveform generated by the waveform generation means. Thus, when the operator presses or touches the panel of the input apparatus with his or her finger or the like, the panel starts vibrating. When the input apparatus confirms that the front surface of the panel has been pressed or touched, the panel largely vibrates.

In addition, according to the present invention, a control method of an input apparatus for performing an input operation as a pressing operation or a touching operation on a front surface of a panel is provided. This method comprises the steps of generating a signal waveform after the pressing operation or the touching operation is performed when it is detected that the pressing operation or the touching operation is being performed; generating a signal waveform having a larger amplitude after the pressing operation or the touching operation is confirmed than the signal waveform generated after the pressing operation or the touching operation is performed; and deforming the panel corresponding to the generated signal waveform.

In the control method of the input apparatus, a signal waveform is generated after the pressing operation or the touching operation is performed when it is detected that the pressing operation or the touching operation is being performed. A signal waveform having a larger amplitude is generated after the pressing operation or the touching operation is confirmed than the signal waveform generated after the pressing operation or the touching operation is performed. The panel is deformed corresponding to the generated signal waveform.

In addition, according to the present invention, an input apparatus for performing an input operation as a pressing operation or a touching operation on a front surface of a panel is provided. The input apparatus comprises input detection means for detecting whether the pressing operation or the touching operation is being performed on the front surface of the panel; time period measurement means for measuring a time period after the pressing operation or the touching operation is performed until the pressing operation or the touching operation is confirmed when the input detection means detects that the pressing operation or the touching operation is being performed on the front surface of the panel; waveform generation means for generating a signal waveform corresponding to the time period measured by the time period measurement means; and panel deforming means for deforming the panel corresponding to the signal waveform generated by the waveform generation means.

In the input apparatus, the input detection means detects whether the pressing operation or the touching operation is being performed on the front surface of the panel. The time period measurement, means measures a time period after the pressing operation or the touching operation is performed until the pressing operation or the touching operation is confirmed when the input detection means detects that the pressing operation or the touching operation is being performed on the front surface of the panel. The waveform generation means generates a signal waveform corresponding to the time period measured by the time period measurement means. The panel deforming means deforms the panel corresponding to the signal waveform generated by the waveform generation means.

For example, when the operator strongly presses the panel, the input apparatus confirms that the panel has been pressed in a shorter time period than he or she weakly presses the panel. Thus, a signal waveform that causes the panel to largely deform is generated. Corresponding to the signal waveform, the panel deforms. In contrast, when the operator weakly presses the panel, since it takes a long time period for the input apparatus to confirm that the panel has been pressed. Thus, a signal waveform that causes the panel to finely deform is generated. Corresponding to the signal waveform, the operator can know whether he or she is strongly pressing the panel.

In addition, according to the present invention, a control method of an input apparatus for performing an input operation as a pressing operation or a touching operation on a front surface of a panel is provided. The method comprises the steps of measuring a time period after the pressing operation or the touching operation is performed until the pressing operation or the touching operation is confirmed when it is detected that the pressing operation or the touching operation is being performed on the front surface of the panel; generating a signal waveform corresponding to the measured time period; and deforming the panel corresponding to the signal waveform generated by the waveform generation means.

In the control method, a time period is measured after the pressing operation or the touching operation is performed until the pressing operation or the touching operation is confirmed when it is detected that the pressing operation or the touching operation is being performed on the front surface of the panel. A signal waveform is generated corresponding to the measured time period. The panel is deformed corresponding to the signal waveform generated by the waveform generation means.

In the input apparatus according to the present invention, after the operator presses or touches the panel with for example his or her finger or the like until the pressing or touching operation is confirmed, the panel is deformed corresponding to a signal waveform having a small amplitude. After the pressing or touching operation has been confirmed, the panel is deformed corresponding to a signal waveform having a large amplitude. Thus, when the operator presses or touches the panel, he or she can feel a stroke sense with small vibration of the panel. After the pressing or touching operation has been confirmed, the operator can feel a click sense with large vibration of the panel. When the operator performs the input operation, since he or she can feel a stroke sense, he or she can safely and accurately perform the input operation.

In addition, the input apparatus according to the present invention measures a time period after the panel is pressed or touched until the pressing or touching operation is confirmed. Corresponding to the time period, the input apparatus generates a signal waveform corresponding to the measured time period. The input apparatus deforms the panel corresponding to the signal waveform. When the panel is strongly operated and it takes a short time period until the operation is confirmed, the input apparatus largely vibrates the panel. In contrast, when the panel is weakly operated and it takes a long time period until the operation is confirmed, the input apparatus can finely vibrate the panel. Since the input apparatus gives feedback to the operator in different manners depending on how he or she operates the panel, he or she can naturally learn an optimum operation method. Thus, the operator does not need to operate the input apparatus with excessive force. As a result, fatigue of fingers and stress in the operation of the touch panel type input apparatus are lightened. Thus, the operability of the input apparatus is improved.

BRIEF DESCRIPTION OF DRAWINGS

FIG. 2 show a mount state of a piezoelectric actuator on a flexible board.

FIG. 2A is an outlined plan view showing the flexible board.

FIG. 2B is a sectional view taken along line X-X.

BEST MODES FOR CARRYING OUT THE INVENTION

Next, with reference to the accompanying drawings, an example of an input apparatus having a resistive film type touch panel used as a control panel that operates a broadcasting device such as a switcher device that selects an input picture according to an embodiment of the present invention will be described.

Figure 1:
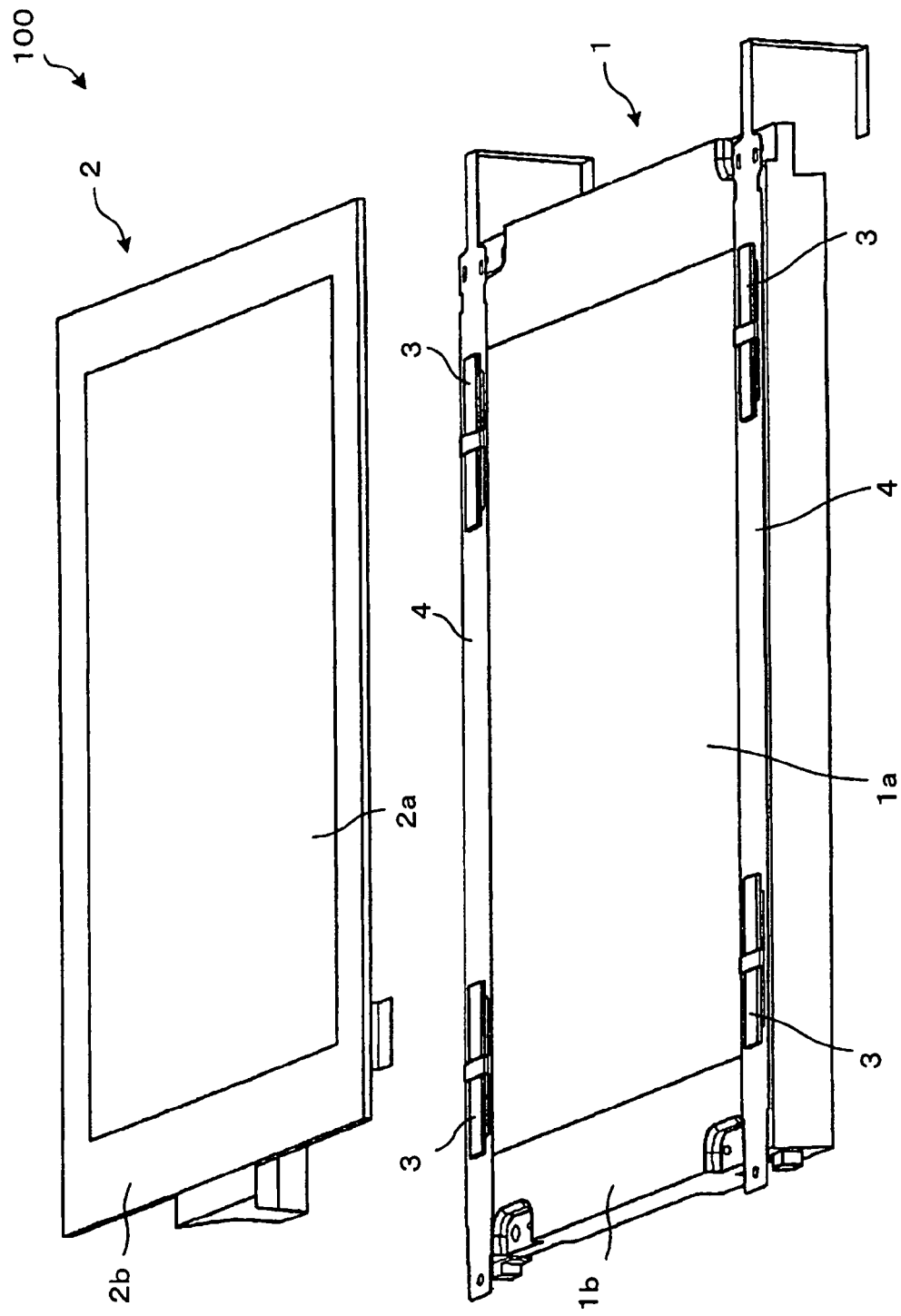
FIG. 1 is an outlined exploded perspective view showing an input apparatus according to an embodiment of the present invention.

FIG. 1 is an outlined exploded perspective view showing an input apparatus according to this embodiment of the present invention.

An input apparatus 100 shown in FIG. 1 has a liquid crystal display section 1 and a touch panel section 2 disposed on the display surface thereof. Flexible boards 4 are secured to the display surface side of the liquid crystal display section 1. Piezoelectric actuators 3 are mounted on each of the flexible boards 4.

The liquid crystal display sectional has a display panel 1a on which an image is displayed and a frame 1b that holds the display panel 1a. The display panel 1a contains a liquid crystal substrate, a backlight, and so forth (not shown). The frame 1b is made of for example a metal. The frame 1b is disposed so that it does not block the display area of the display surface of the display panel 1a.

The touch panel section 2 has a sensor that detects an input operation of the operator. In this example, the touch panel section 2 is a resistive film type touch panel that has a resistive film type sensor. The touch panel section 2 is composed of a pressing portion 2a that the operator presses and a frame 2b that holds the pressing portion 2a. The pressing portion 2a is made of a transparent resin sheet. The pressing portion 2a transmits an image displayed on the display panel 1a of the liquid crystal display section 1. The frame 2b is made of for example a metal. The frame 2b is disposed so that it does not block the display area of the display panel 1a.

The resistive film type touch panel used as the touch panel section 2 is composed of a plurality of electrode sheets that are oppositely arranged and spaced apart by a predetermined distance. When the operator presses the pressing portion 2a shown in FIG. 1 with his or her finger or a pointing device such as a pen, the electrode sheets contact each other. At this point, the pointed position is identified as a coordinate value by detecting a change of resistance on each electrode sheet.

The piezoelectric actuator 3 is for example a piezoelectric bimorph device. The piezoelectric bimorph device has a structure of which an electrode plate is sandwiched by a plurality of piezoelectric sheets. The piezoelectric bimorph device tends to bend when a voltage is applied to both the surfaces thereof. In the input apparatus 100, the piezoelectric actuator 3 bends and deforms corresponding to a drive voltage applied through a wiring formed on the flexible board 4.

The flexible board 4 is a flexible wiring board of which a wiring of conductive metal foil such as copper foil is formed on a resin film such as polyimide. The flexible board 4 has electrodes through which a drive voltage is supplied to the piezoelectric actuator 3. In addition, the flexible board 4 has a pair of through-holes with which the piezoelectric actuator 3 is held. The through-holes will be described later.

In the input apparatus 100, the flexible boards 4 and the piezoelectric actuators 3 are sandwiched by the display surface of the liquid crystal display section 1 and the touch panel section 2. The pressing portion 2a of the touch panel section 2 transmits images of operation function items such as icons displayed by the display panel 1a of the liquid crystal display section 1. When the operator presses an image display position on the pressing portion 2a, an input operation corresponding to the display image is performed.

The liquid crystal display section 1 and the touch panel section 2 are mounted on a housing (not shown) of the input apparatus 100. At this point, the touch panel section 2 is disposed on the liquid crystal display section 1 so that the touch panel section 2 is movable perpendicular to the display surface. Thus, when the piezoelectric actuator 3 curves and deforms, the distance between the liquid crystal display section 1 and the touch panel section 2 varies. A circuit that detects a pressing operation of the touch panel section 2 and that performs a drive control of the piezoelectric actuator 3 corresponding to the pressing operation is disposed for example in the housing.

FIG. 2 shows a state of which the piezoelectric actuator is mounted on the flexible board. FIG. 2A is an outlined plan view showing the flexible board, whereas FIG. 2B is a sectional view taken along line X-X.

As shown in FIG. 2, the flexible board 4 has a mount portion 41 composed of a pair of through-holes 41a and 41b with which the piezoelectric actuator 3 is mounted and wiring patterns 42a and 42b with which a drive voltage is supplied to the piezoelectric actuator 3.

In the mount portion 41, the through-holes 41a and 41b are formed adjacently and in the same shape. A center space portion 41c is formed between the through-holes 41a and 41b. The center space portion 41c is a bridge-shaped resin film that composes the flexible board 4. According to this embodiment, two mount sections 41 are disposed on each of the flexible board 4.

The wiring patterns 42a and 42b are formed so that wirings are connected to one end of the mount portion 41. Wiring terminals 31a and 31b are formed on one end of the piezoelectric actuator 3. When the wiring terminals 31a and 31b contact the wiring patterns 42a and 42b on the flexible board 4, respectively, a drive voltage is supplied from a driver circuit (not shown) to the piezoelectric actuator 3.

The piezoelectric actuator 3 is inserted into the through-hole 41a from the front of the mount portion 41. Then, the piezoelectric actuator 3 is inserted into the through-hole 41b from the rear of the mount portion 41 through the center spacer portion 41c. As a result, the piezoelectric actuator 3 is mounted on the flexible board 4 so that both ends in the longitudinal direction of the piezoelectric actuator 3 contact the front surface of the flexible board 4. The piezoelectric actuator 3 is relatively highly rigid, whereas the flexible board 4 easily deforms. Thus, as shown in FIG. 2B, the piezoelectric actuator 3 is held by the mount portion 41 in the state that only the center spacer portion 41c deforms upward. At this point, the wiring terminals 31a and 31b formed one end of the piezoelectric actuator 3 contact the wiring patterns 42a and 42b formed on the flexible board 4, respectively. As a result, the wiring terminals 31a and 31b are electrically connected to the wiring patterns 42a and 42b, respectively. It is preferred that after the wiring terminals 31a and 31b are contacted to the wiring patterns 42a and 42b, respectively, the contacted points be fixed by for example solder so that the piezoelectric actuator 3 itself is secured on the flexible board 4.

After the piezoelectric actuators 3 have been mounted in the foregoing manner, the flexible boards 4 are sandwiched by the frame 1b of the liquid crystal display section 1 and the frame 2b of the touch sensor portion 2. At this point, for example, the upper surface (shown in FIG. 2) of the center spacer portion 41c contacts the frame 2b of the touch panel section 2. For example, areas 43a and 43b of which the lower surface (shown in FIG. 2) of the center spacer portion 41c contact the piezoelectric actuator 3 contact the frame 1b of the liquid crystal display section 1. In this mount structure, the center spacer portion 41c of the flexible board 4 functions as a spacer between the frame 2b of the touch panel section 2 and the piezoelectric actuator 3. On the other hand, the areas 43a and 43b of the flexible board 4 function as spacers between the frame 1b of the liquid crystal display section 1 and the piezoelectric actuator 3.

In this state, when the drive voltage is supplied to the piezoelectric actuator 3, it curves and deforms corresponding to the drive voltage. As described above, the piezoelectric actuator 3 has the two wiring terminals 31a and 31b. When the potential between these wiring terminals 31a and 31b is 0, the piezoelectric actuator 3 does not curve. As the potential is increased, the piezoelectric actuator 3 largely curves. The direction in which the piezoelectric actuator 3 curves is inverted when the polarity of the voltage is inverted. Thus, when the voltage (amplitude), frequency, waveform (square wave or sine wave), and so forth of the drive voltage are controlled in the input apparatus 100, the amount, period, and direction for which the piezoelectric actuator 3 curves, of curvature, curving period, curving direction, and so forth can be varied.

When the piezoelectric actuator 3 curves, as the center portion thereof deforms, the center spacer portion 41c vertically moves toward the liquid crystal display section 1. Thus, as the center spacer portion 41c deforms, the touch panel portion 2 moves and the front surface of the panel deforms. As a result, the touch panel section 2 feeds back a force sense to the operator.

A reinforcement sheet made of a material having high rigidity such as celluloid may be adhered to the front surface of the center spacer portion 41c or the rear surface of the areas of which the both ends of the center spacer portion 41c contact the piezoelectric actuator 3.

The foregoing mounting method of the piezoelectric actuator 3 is just an example. As long as a spacer is disposed near a center portion of one surface of the piezoelectric actuator 3 and spacers are disposed at both ends in the longitudinal direction of the other surface, the piezoelectric actuator 3 may be mounted in other than the foregoing method.

Next, a structure of hardware of the input apparatus 100 according to a first embodiment of the present invention will be described. According to the first embodiment, the input apparatus 100 is denoted by an input apparatus 100a.

Figure 3:
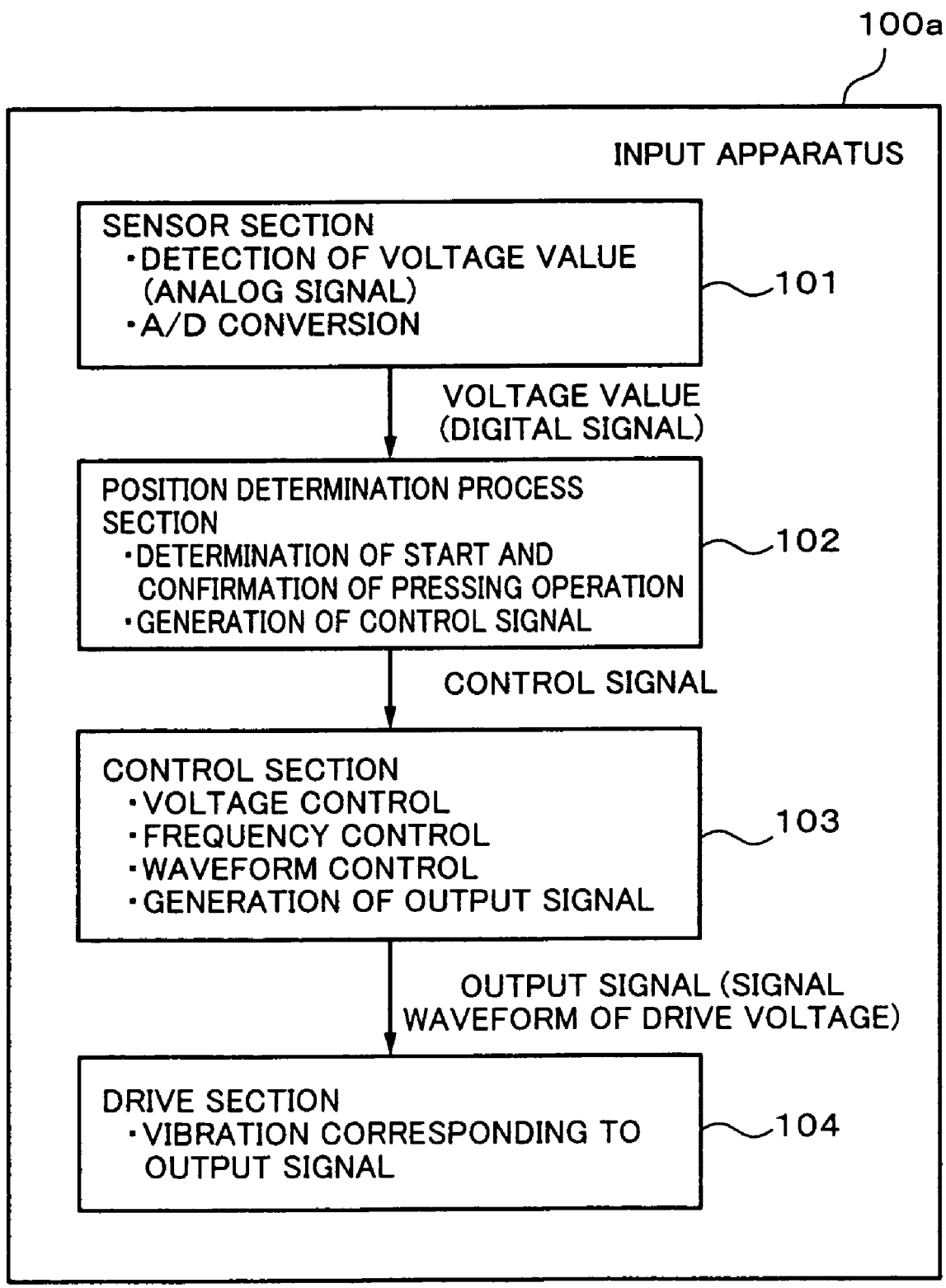
FIG. 3 is a block diagram showing hardware of an input apparatus according to a first embodiment.

FIG. 3 shows a block of hardware of the input apparatus according to the first embodiment.

The input apparatus 100a according to the first embodiment has a sensor section 101, a position determination process section 102, a control section 103, and a drive section 104.

The sensor section 101 is disposed in the touch panel section 2. The sensor section 101 has a sensor that detects whether the operator is performing a touching operation on the input apparatus 100a. The sensor section 101 detects whether the front surface of a panel (touching portion 2a) of the touch panel section 2 is being pressed according to a resistive film system.

When the operator presses the front surface of the panel of the analog resistive film type touch panel used as the touch panel section 2 in this embodiment with his or her finger or the like, electrode sheets that are oppositely arranged and spaced apart by a predetermined distance contact and conduct electricity. The resistance value at the contacted position (as an XY coordinate value) on the electrode sheets varies. As a result, the voltage value at the contacted position (as the XY coordinate value) varies. The voltage value at the contacted position (as the XY coordinate value) is 0 V or nearly 0 V until the front surface of the resistive film type touch panel is pressed with the finger or the like. As the front surface of the panel is continuously pressed, the resistance value gradually increases. When the front surface is pressed for a predetermined time period, the voltage value becomes saturated and constant.

When the voltage value becomes stable, the input apparatus 100a confirms that the operator has pressed the panel. The input apparatus confirms that the operator has pressed the panel after he or she has pressed the panel, the voltage value has become stable in a predetermined variation range, and a predetermined time period has elapsed. The time period after the voltage value becomes stable until the pressing operation is confirmed can be preset to the input apparatus 100a.

The sensor section 101 detects whether the front surface of the panel is being pressed with a voltage value at a position (XY coordinate value) (analog signal). The voltage value is A/D converted and detected as data value (digital signal).

The position determination process section 102 periodically reads a data value at the position (XY coordinate value) detected by the sensor section 101, monitors the change of the detected data value, and determines the press start time of the front surface of the panel and the press confirmation time. In other words, the position determination process section 102 determines the time at which the detected data value starts varying as the press start time. On the other hand, the position determination process section 102 determines the time at which the detected data value has become stable and a predetermined time period has elapsed as the press confirmation time.

After the detected data value has become stable and the predetermined time period elapsed, the input apparatus 100a confirms that the front surface of the panel has been pressed. At this point, the position determination process section 102 identifies the X-Y coordinate value at the pressed position on the electrode sheets with the detected data value and stores the identified coordinate value as position information. The process of the position determination process section 102 may be accomplished by a CPU instead of the block of hardware.

In addition, the position determination process section 102 generates a control signal that is output after the front surface of the panel is pressed until the pressing operation is confirmed and a control signal that is output after the pressing operation is confirmed corresponding to the input state. The position determination process section 102 controls the control section 103 corresponding to the control signals. The control signals generated by the position determination process section 102 are digital signals that contain a voltage (amplitude), frequency, and waveform (square wave or sine wave).

The control section 103 is a waveform generation device. The control section 103 controls a voltage, frequency, and waveform corresponding to a control signal supplied from the position determination process section 102 to generate a signal waveform of a drive voltage with which the control section 103 drives the drive section 104 and outputs the signal waveform as an output signal.

Figure 4:
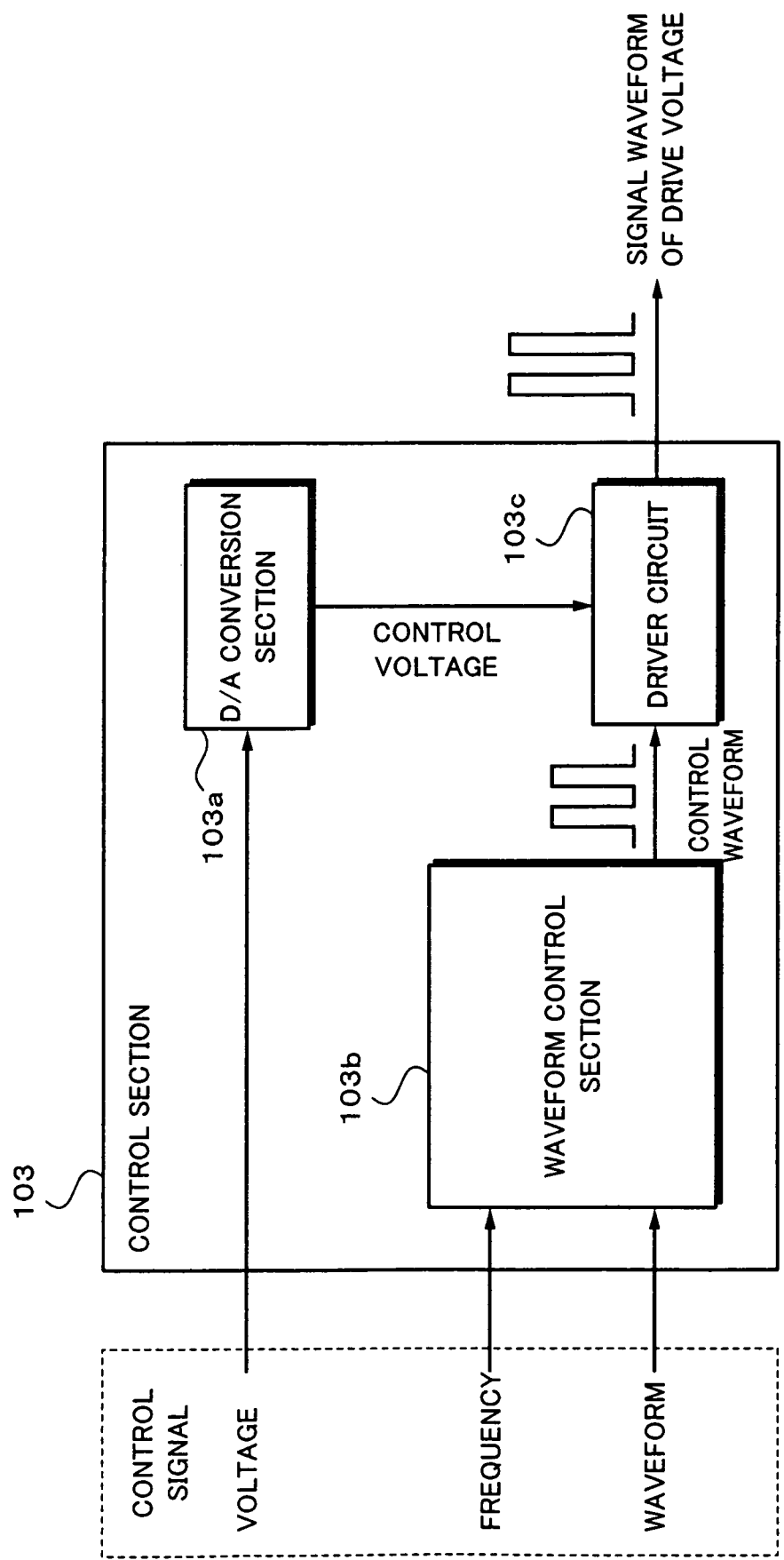
FIG. 4 is a schematic diagram showing an example of a structure of a control section according to the first embodiment.

FIG. 4 is a schematic diagram showing an example of a structure of the control section according to the first embodiment.

As shown in FIG. 4, the control section 103 has for example a D/A conversion section 103a, a waveform control section 103b, and a driver circuit 103c.

The D/A conversion section 103a converts a voltage contained in the control signal outputted from the position determination process section 102 into an analog value and outputs the converted control voltage to the driver circuit 103c.

The waveform control section 103b generates a square wave or a sine wave having a predetermined frequency with a frequency and a waveform contained in the control signal outputted from the position determination process section 102 and outputs the generated control waveform to the driver circuit 103c.

The driver circuit 103c outputs a signal waveform of a drive voltage to the drive section 104 corresponding to the control voltage outputted from the D/A conversion section 103a and the control waveform outputted from the waveform control section 103b.

Since the control section 103 generates an output signal to control the drive section 104, as long as the control section 103 can generate a signal waveform corresponding to the drive section 104, the structure of the control section 103 is not limited to the foregoing example.

The drive section 104 is the foregoing piezoelectric actuator 3. The piezoelectric actuator 3 curves and deforms corresponding to the signal waveform of the drive voltage outputted from the control section 103. An AC voltage such as an AC square wave voltage or an AC sine wave voltage is supplied to the drive section 104. When such an AC drive voltage is supplied to the piezoelectric actuator 3, it can be finely vibrated. As a result, the touch panel section 2 can be finely vibrated.

Next, a method of causing the operator to feel a virtual stroke with the foregoing input apparatus 100a will be described.

Figure 5:
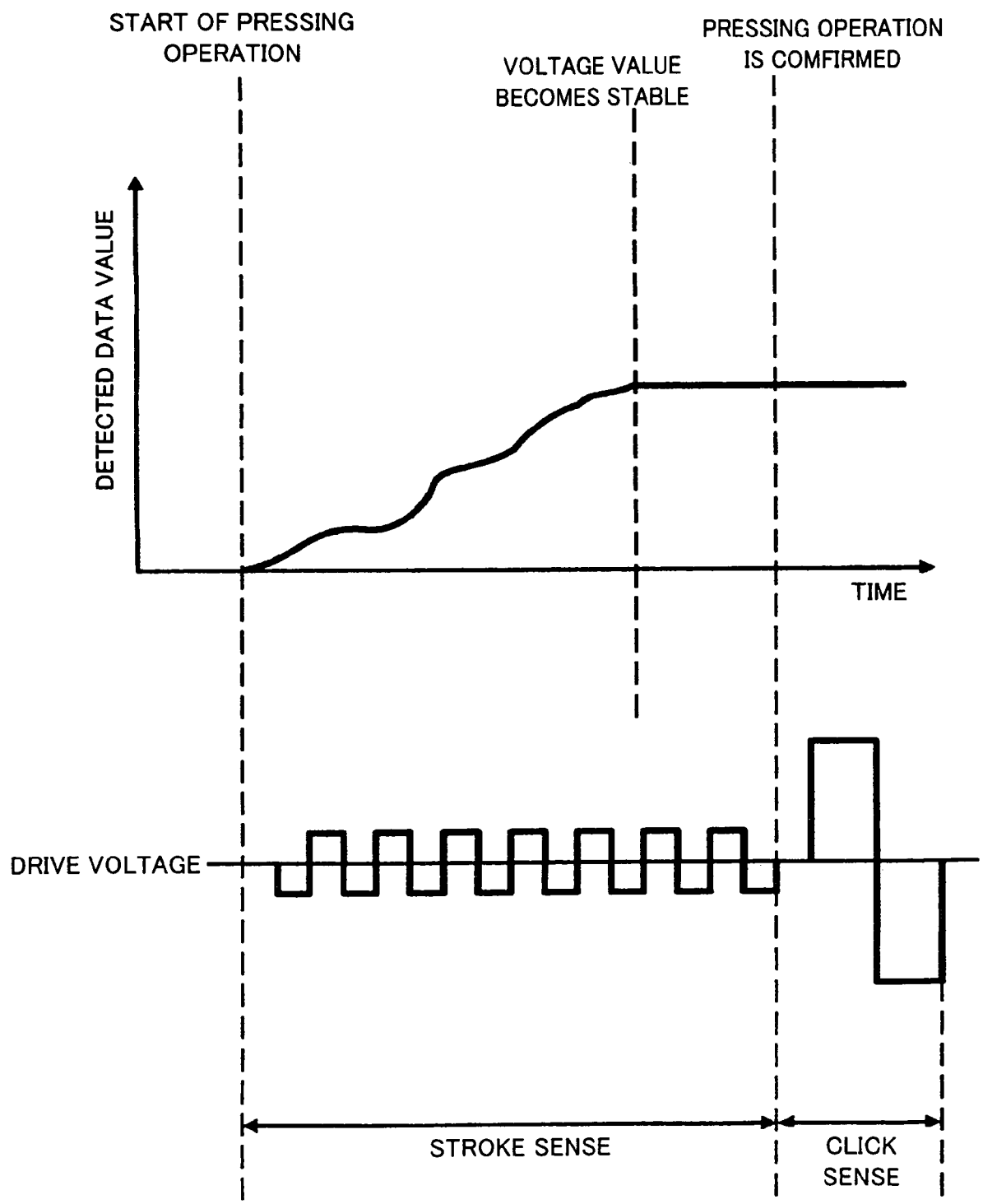
FIG. 5 shows graphs describing a relationship of a panel press period and a drive voltage of the piezoelectric actuator.

FIG. 5 shows graphs describing a relationship of a panel press period and a drive voltage of the piezoelectric actuator. An upper graph of FIG. 5 shows a relationship of a panel press period of the touch panel section 2 and a detected data value. A lower graph of FIG. 5 shows a signal waveform of a drive voltage supplied to the piezoelectric actuator 3. In addition, the upper graph of FIG. 5 shows a change of a detected data value in the X direction.

As shown the upper graph of FIG. 5, before the front surface of the panel of the touch panel section 2 is pressed, the data value detected in the input operation is 0 or close to 0. When the front surface of the panel of the touch panel section 2 is continuously pressed, the detected data value gradually increases. When the front surface of the panel is kept pressed, the detected data value becomes stable. The input apparatus 100a supplies a drive voltage having a signal waveform as shown in the lower graph of FIG. 5 to the piezoelectric actuator 3 corresponding to the detected data value that varies as shown in the upper graph of FIG. 5. As a result, the input apparatus 100a allows the operator to feel a virtual stroke.

In other words, after the pressing operation is started until the pressing operation is confirmed, the input apparatus 100a supplies a small-amplitude high-frequency AC square wave voltage to the piezoelectric actuator 3 to finely vibrate the piezoelectric actuator 3 and weakly vibrate the touch panel section 2. After the pressing operation is confirmed, the input apparatus 100a supplies a large-amplitude low-frequency AC square voltage to the piezoelectric actuator 3 to largely vibrate the piezoelectric actuator 3 and the touch panel section 2. The time period after the pressing operation is started until the pressing operation is confirmed is around several ten ms to 100 ms. Since the touch panel section 2 weakly vibrates and feeds back a force sense to the operator after the pressing operation is started until the pressing operation is confirmed, he or she can feel a stroke sense as if he or she pressed a switch button. In addition, since the operator feels strong vibration after the pressing operation is confirmed he or she can feel a click sense as if he or she pressed a switch button.

The operator may feel comfortable when the input apparatus 100a causes him or her to feel a longer stroke sense depending on the application that he or she uses for the input apparatus 100a.

Figure 6:
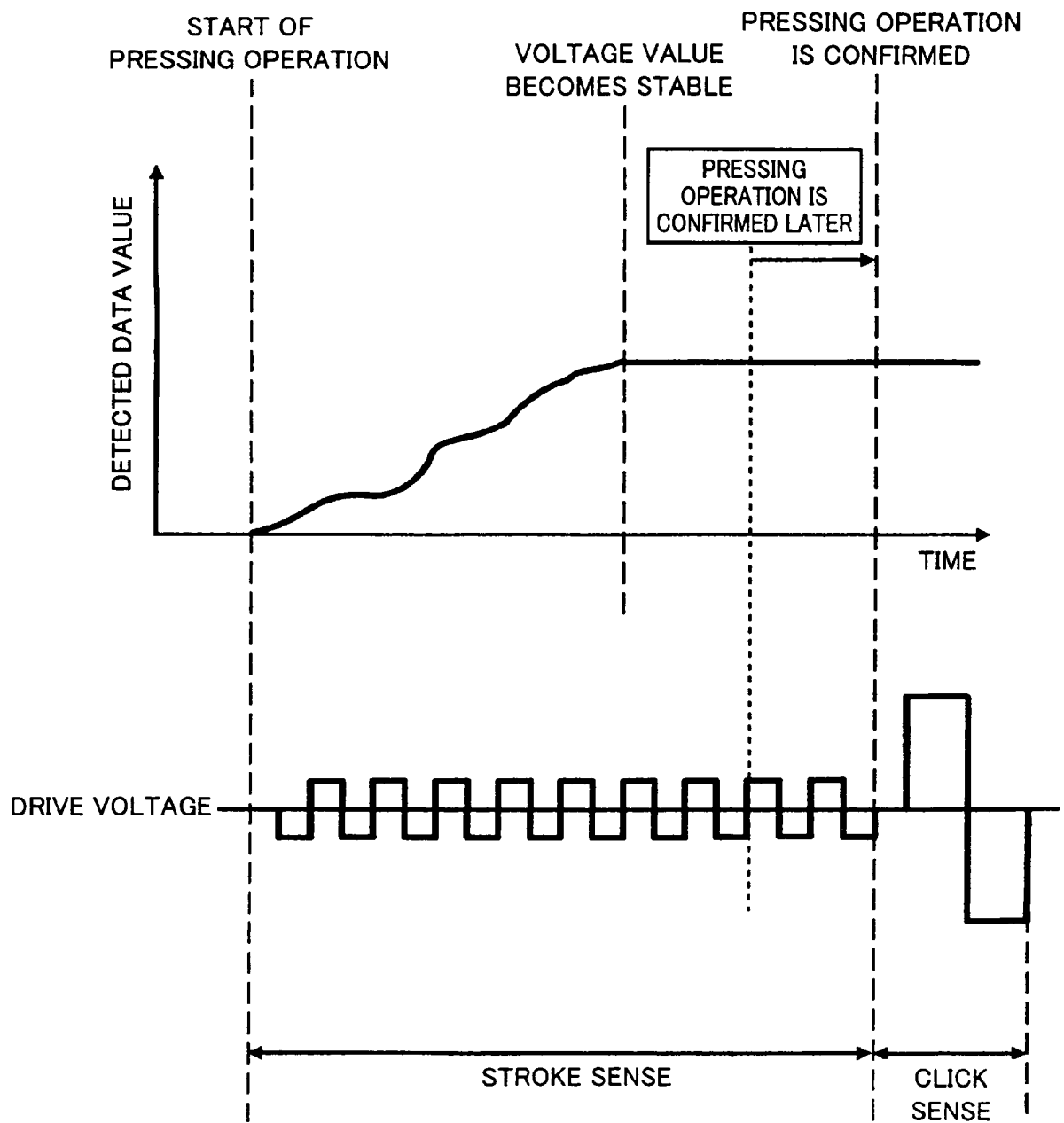
FIG. 6 shows graphs describing another relationship of the panel press period and the drive voltage of the piezoelectric actuator.

FIG. 6 shows other graphs describing a relationship of a panel press period and a drive voltage of the piezoelectric actuator. An upper graph of FIG. 6 shows a relationship of a panel press period and a detected data value. A lower graph of FIG. 6 shows a signal waveform of a drive voltage supplied to the piezoelectric actuator 3. In addition, the upper graph of FIG. 6 shows a change of the detected data value in the X direction.

As shown in the upper graph of FIG. 6, like that of FIG. 5, before the front surface of the panel of the touch panel section 2 is pressed, the data value detected in the input operation is 0 or close to 0. When the front surface of the panel of the touch panel section 2 is continuously pressed, the detected data value gradually increases. When the front surface of the panel is kept pressed, the detected data value becomes stable.

To allow the operator to feel a longer stroke sense, as shown in FIG. 6, the input apparatus 100a is set so that the pressing operation is confirmed later. After the pressing operation is started until the pressing operation is confirmed later, the input apparatus 100a supplies a small-amplitude high frequency AC square wave voltage to the piezoelectric actuator 3. Thereafter, the input apparatus 100a supplies a large-amplitude low-frequency AC square wave voltage to the piezoelectric actuator 3. Thus, the piezoelectric actuator 3 and the touch panel section 2 weakly vibrate after the pressing operation is started until the pressing operation is confirmed later. Thereafter, the piezoelectric actuator 3 and the touch panel section 2 strongly vibrate. Thus, the operator can feel a long stroke sense.

In the examples shown in FIG. 5 and FIG. 6, an AC square wave voltage is supplied to the piezoelectric actuator 3. Of course, an AC sine wave voltage may be supplied to the piezoelectric actuator 3. However, the operator can more easily recognize a square wave as vibration than a sine wave. In addition, the voltage of the square wave can be lower than the voltage of the sine wave.

In the input apparatus 100a, the voltage, frequency, waveform, and supply period of the drive voltage that allow the operator to feel a stroke sense depend on the press confirmation time determined with the voltage value detected from the touch panel section 2, the type of the application used for the input apparatus 100a, and so forth. Thus, they can be freely preset.

When the input apparatus 100a weakly vibrates the piezoelectric actuator 3 and the touch panel section 2 after the pressing operation is started until the pressing operation is confirmed, the frequency of the piezoelectric actuator 3 and the touch panel section 2 can be varied. For example, when the pressing operation is started, the input apparatus 100a may vary the frequency of the piezoelectric actuator 3 and touch panel section 2 from 50 Hz to 100 Hz and the voltage from ½ to ⅛ of the peak voltage at which the input apparatus 100a to cause the operator to feel a click sense so that the piezoelectric actuator 3 and the touch panel section 2 vibrate with a square wave. Thus, the operator can feel a stroke sense as if he or she felt a real stroke. However, if the frequency and the voltage are excessively high, the operator may hear weak audible vibration that causes the operator to feel a stroke sense. Depending on the mounting condition for the input apparatus 100a, such excessively high frequency and voltage cause the operator to feel noisy. Thus, this point should be carefully considered.

In addition, since a liquid crystal display section and a touch panel section of a normal input apparatus are spaced apart, the operator may press a position for a non-display-button on the touch panel due to a parallax. In this case, the apparatus does not accept the input. In this case, when the operator presses the panel, the input apparatus 100a supplies a predetermined drive voltage to the piezoelectric actuator 3 so that it weakly vibrates, causing the operator to feel a click sense. Thereafter, the input apparatus 100a may stop supplying the drive voltage to the piezoelectric actuator 3 so that it stops vibrating, causing the operator not to feel a click sense. Thus, the operator can recognize that he or she is pressing the panel. In addition, since the operator does not feel a click sense, he or she can recognize that he or she is pressing an incorrect position on the panel.

In such a case, the piezoelectric actuator 3 may vibrate in a different manner than it vibrates to cause the operator to feel a stroke sense and a click sense. Instead, the input apparatus 100a may generate an alarm sound.

In the foregoing description, the resistive film type touch panel that has the resistive film type sensor section 101 is used as the touch panel section 2 of the input apparatus 100a. The touch panel section 2 may use various types of touch panels such as capacity type, optical type, ultrasonic type, electromagnetic induction type, or the like to cause the operator to feel a stroke sense and a click sense. In other words, as long as a sensor that detects any change in a signal (detected data value) detected after the input operation is started until the input operation is confirmed, the operator can be caused to feel a stroke sense.

When the touch panel section 2 is of the capacity type, a touching portion that the operator touches with his or her finger is formed of a transparent electroconductive panel. A circuit that applies a voltage and detects a current is disposed inside the frame (below an outer edge of the touching portion). A constant voltage is applied to the electroconductive panel. When the operator touches the touch panel of the input apparatus with his or her finger, the capacity of the panel varies. The varied capacity is detected as a current value.

When the touch panel section 2 is of the optical type, a touching portion is formed of a transparent panel made of glass, acrylic resin, or the like. A light emitting device such as an LED (Liquid Crystal Display) and a light receiving device are disposed inside the frame (below an outer edge and of the touching portion). The front surface of the touching portion is radiated with an infrared ray in a matrix shape. The infrared ray is received by the opposite light receiving device. When the operator touches the front surface of the panel of the input apparatus with his or her finger or the like, the infrared ray is blocked. The variation of the blocked infrared ray is detected as an electric signal.

When the touch panel section 2 is of the ultrasonic type, a touching portion is formed of a transparent panel. A transmitters and a receiver are disposed inside the frame (below an outer edge of the touching portion) so that they are opposite in the X and Y directions. An oscillator generates a surface acoustic wave on the front surface of the touching portion. When the operator touches his or her finger on the front surface of the touch panel of the input apparatus, the vibration of the touching portion is absorbed by the finger. As a result, a delay of the surface acoustic wave is detected.

When the touch panel section 2 is of the electromagnetic induction type, an input operation is performed with a pen type pointing device or the like that contains a circuit that generates a magnetic field on a touching portion formed of a transparent panel. Many sensor coils that detect the magnetic field are disposed as a sensor section on the rear side of the panel (on the rear side of the operation surface). When the operator touches the front surface of the touch panel with the pointing device, the sensor section detects a change of the magnetic field.

When one of these types is used, a flexible board that mounts a piezoelectric actuator is disposed between the frame of the panel as the touching portion and the frame of the liquid crystal display section. In any type, a time period after a detected data value varies until it becomes stable, namely after the input operation is started until the input operation is confirmed, is in the range from around several 10 ms to 100 ms like the resistive film type. A signal that varies when the operator touches the front surface of the panel is detected. A signal waveform of a drive voltage supplied to the piezoelectric actuator is generated corresponding to the signal. Corresponding to the signal waveform, the piezoelectric actuator is driven to vibrate the panel. As a result, the operator can feel a stroke sense and click sense.

As described above, in the touch panel type input apparatus according to the first embodiment of the present invention, after the input operation of which the operator presses or touches the front surface of the panel is started until the input operation is confirmed, the panel is weakly vibrated so that the operator can feel a stroke sense. Thus, the operator can safely perform the input operation. As a result, the operator can know when he or she started pressing the panel for the input operation. Thus, the operator can continue the remaining input operation with his or her finger or the like. In addition, the operator can unconsciously know that his or her operation is correct with a feedback of weak vibration on the panel. Thus, the operator can lightly press the panel with his or her finger, or the like.

When the operator presses a non-display button area on the panel of the conventional input apparatus, it does not react to the operation. Thus, the operator cannot determine whether he or she is pressing a display button weakly or incorrectly. However, in the input apparatus according to the present invention, when the operator presses the panel, since it vibrates, he or she feels a stroke sense. Thus, at least, the operator can recognize that he or she is pressing the panel. When the operator presses a non-display-button on the panel, since the input apparatus stops vibrating the panel, the operator cannot feel a click sense. Thus, the operator can recognize that he or she is pressing an incorrect position on the panel. Instead, the input apparatus may vibrate the panel to inform the operator of an error or may generate an alarm. Thus, the operator's stress against incorrect operation to the input apparatus can be lightened.

The touch panel type input apparatus is an important interface section because an operator's impression about the entire system depends on the operability of the input apparatus. The input apparatus according to the present invention allows an operator who is not accustomed to an input operation to feel senses of reliability and confidence.

Next, a structure of hardware of the foregoing input apparatus 100 according to a second embodiment will be described. The input apparatus 100 according to the second embodiment will be denoted by the input apparatus 100b.

Figure 7:
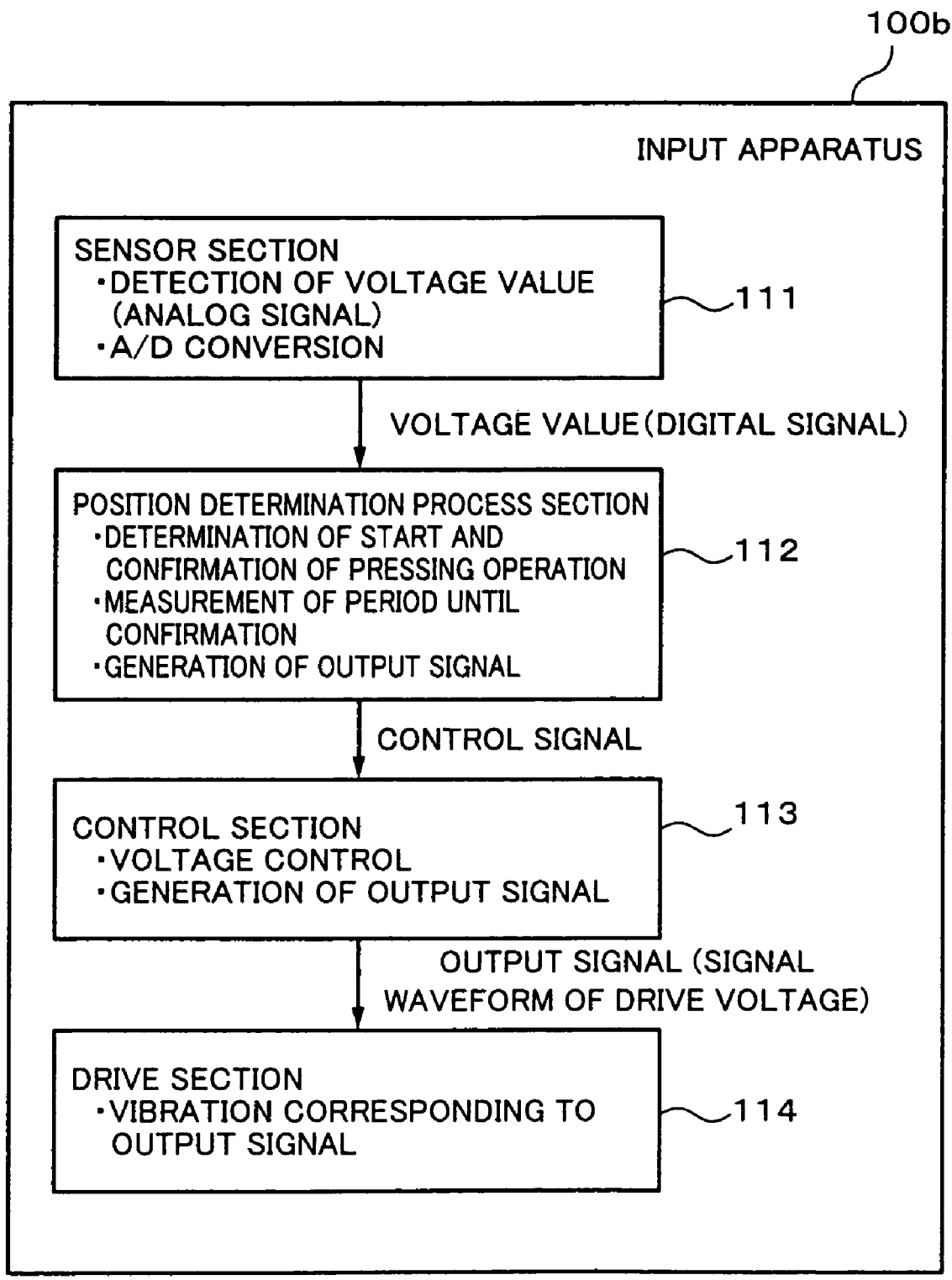
FIG. 7 is a block diagram showing hardware of an input apparatus according to a second embodiment.

FIG. 7 is a block diagram showing the hardware of the input apparatus according to the second embodiment.

The input apparatus 100b has a sensor section 111, a position determination process section 112, a control section 113, and a drive section 114.

The sensor section 111 is disposed in the touch panel section 2. The sensor section 111 has a sensor that detects whether the operator is performing a pressing operation to the input apparatus 100b. In this example, the sensor section 111 detects whether the front surface of a panel (pressing portion 2a) of a resistive film type touch panel section 2 is being pressed.

When the operator presses the front surface of the panel of the analog resistive film type touch panel used as the touch panel section 2 in this embodiment with his or her finger or the like, electrode sheets that are oppositely arranged and spaced apart by a predetermined distance contact and conduct electricity. The resistance value at the contacted position (as an XY coordinate value) on the electrode sheets varies. As a result, the voltage value at the contacted position (as the XY coordinate value) varies. The voltage value at the contacted position (as the XY coordinate value) is 0 V or nearly 0 V until the front surface of the resistive film type touch panel is pressed with the finger or the like. As the front surface of the panel is continuously pressed, the resistance value gradually increases. When the front surface is pressed for a predetermined time period, the voltage value becomes saturated and constant.

When the voltage value becomes stable, the input apparatus 100a confirms that the operator has pressed the panel. The input apparatus confirms that the operator has pressed the panel after he or she has pressed the panel, the voltage value has become stable in a predetermined variation range, and a predetermined time period has elapsed. The time period after the voltage value becomes stable until the pressing operation is confirmed can be preset to the input apparatus 100a.

The sensor section 101 detects whether the front surface of the panel is being pressed with a voltage value at a position (XY coordinate value) (analog signal). The voltage value is A/D converted and detected as data value (digital signal).

The position determination process section 112 periodically reads a data value (XY coordinate value) detected by the sensor section 111, monitors the change, and determines the press start time and the press confirmation time. In other words, the position determination process section 112 determines a time at which the detected data value is varying as a press start time and a time at which after the detected data value has become stable and a predetermined time period has elapsed as a press confirmation time. At this point, the position determination process section 112 measures a time period from the press start time until the press confirmation time with for example a timer disposed in the input apparatus 100b.

In addition, the position determination process section 112 identifies a X-Y coordinate value at the pressed position on the electrode sheets with the detected data value and stores the identified coordinate value as position information after the detected data value has become stable, the predetermined time period has elapsed, and the pressing operation has been confirmed.

The position determination process section 112 generates a control signal corresponding to the time period from the press start time to the press confirmation time and controls the control section 113 corresponding to the control signal. Instead, the position determination process section 112 may compare the measured time period with a predetermined time period, determine whether the measured time period is longer than the predetermined time period, and generate the control signal corresponding to the determined result.

The control signal generated by the position determination process section 112 is a digital signal that contains a voltage (amplitude) condition with which the position determination process section 112 identifies a signal waveform of a drive voltage to drive the drive section 114. In this case, a drive voltage having a signal waveform whose amplitude varies corresponding to the measured time period from the press start time to the press confirmation time is supplied to the drive section 114. When a drive voltage having a signal waveform whose frequency or waveform (square wave or sine wave) instead of the amplitude varies corresponding to the measured time period is supplied to the drive section 114, these conditions may be included in the control signal.

The control section 113 is a waveform generation device. The control section 113 controls a voltage corresponding to a control signal supplied from the position determination process section 112 to generate a signal waveform of a drive voltage with which the control section 113 drives the drive section 114 and outputs the signal waveform as an output signal.

Figure 8:
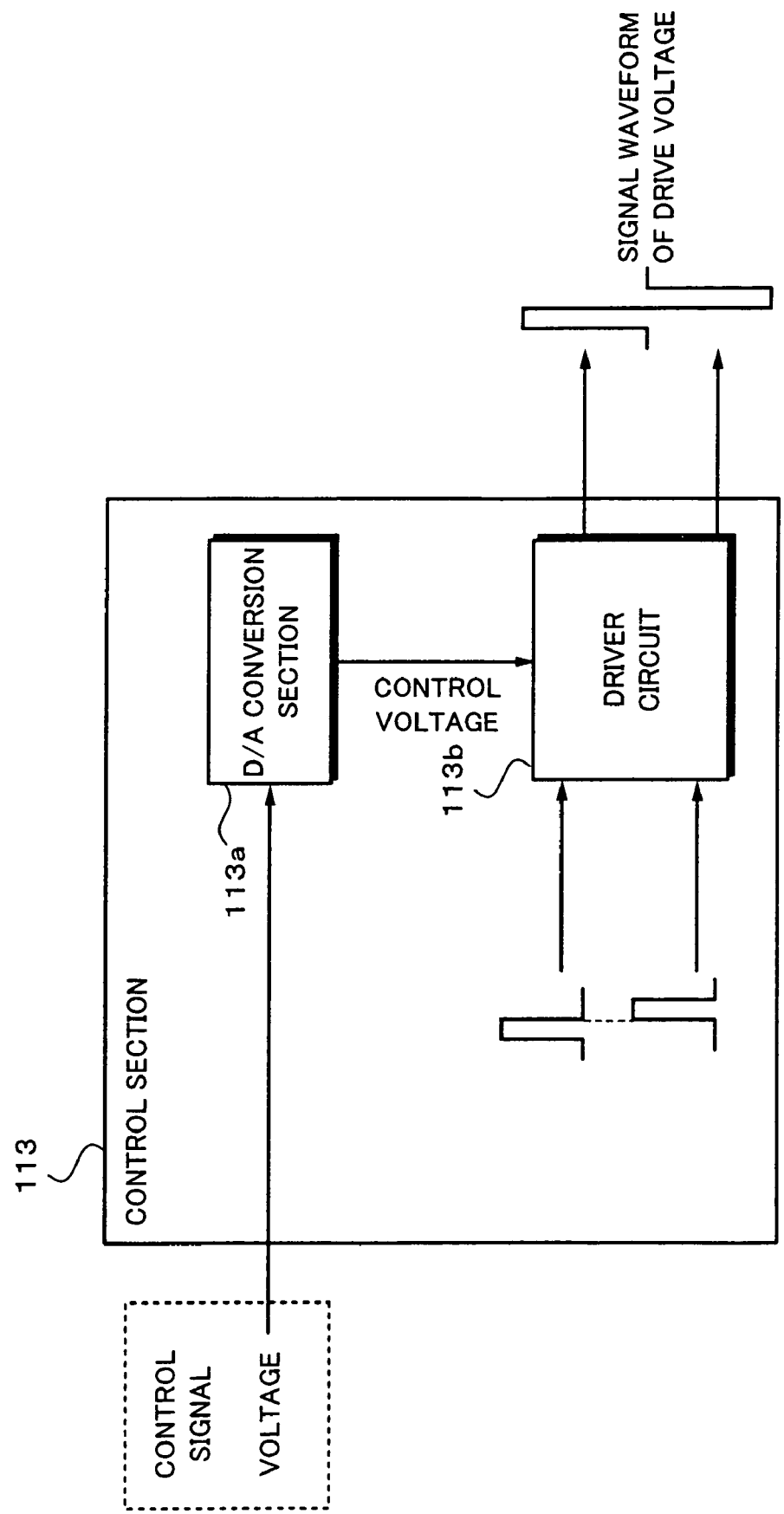
FIG. 8 is a schematic diagram showing an example of a structure of a control section according to the second embodiment.

FIG. 8 is a schematic diagram showing an example of the structure of the control section according to the second embodiment. As shown in FIG. 8, the control section 113 has for example a D/A conversion section 113a and a driver circuit 113b. The D/A conversion section 113a converts a voltage contained in a control signal outputted from the position determination process section 112 into an analog value and outputs the converted control voltage to the driver circuit 113b. The driver circuit 113b outputs a signal waveform of a drive voltage as an output signal to the drive section 114 corresponding to the control voltage outputted from the D/A conversion section 113a.

Since the control section 113 generates an output signal with which the control section 113 controls the drive section 114, as long as the control section 113 can generate a signal waveform corresponding to the drive section 114, the structure of the control section 113 is not limited to such an example.

The drive section 114 is the foregoing piezoelectric actuator 3. The piezoelectric actuator 3 curves and deforms corresponding to the signal waveform of the drive voltage outputted from the control section 113. An AC voltage such as an AC square wave voltage or an AC sine wave voltage can be supplied to the drive section 114. Thus, with the AC voltage, the drive section 114 can finely vibrate the piezoelectric actuator 3 and the touch panel section 2.

Next, a method of controlling the input apparatus 100b having the foregoing structure corresponding to a measured time period until the pressing operation is confirmed will be described.

Figure 9:
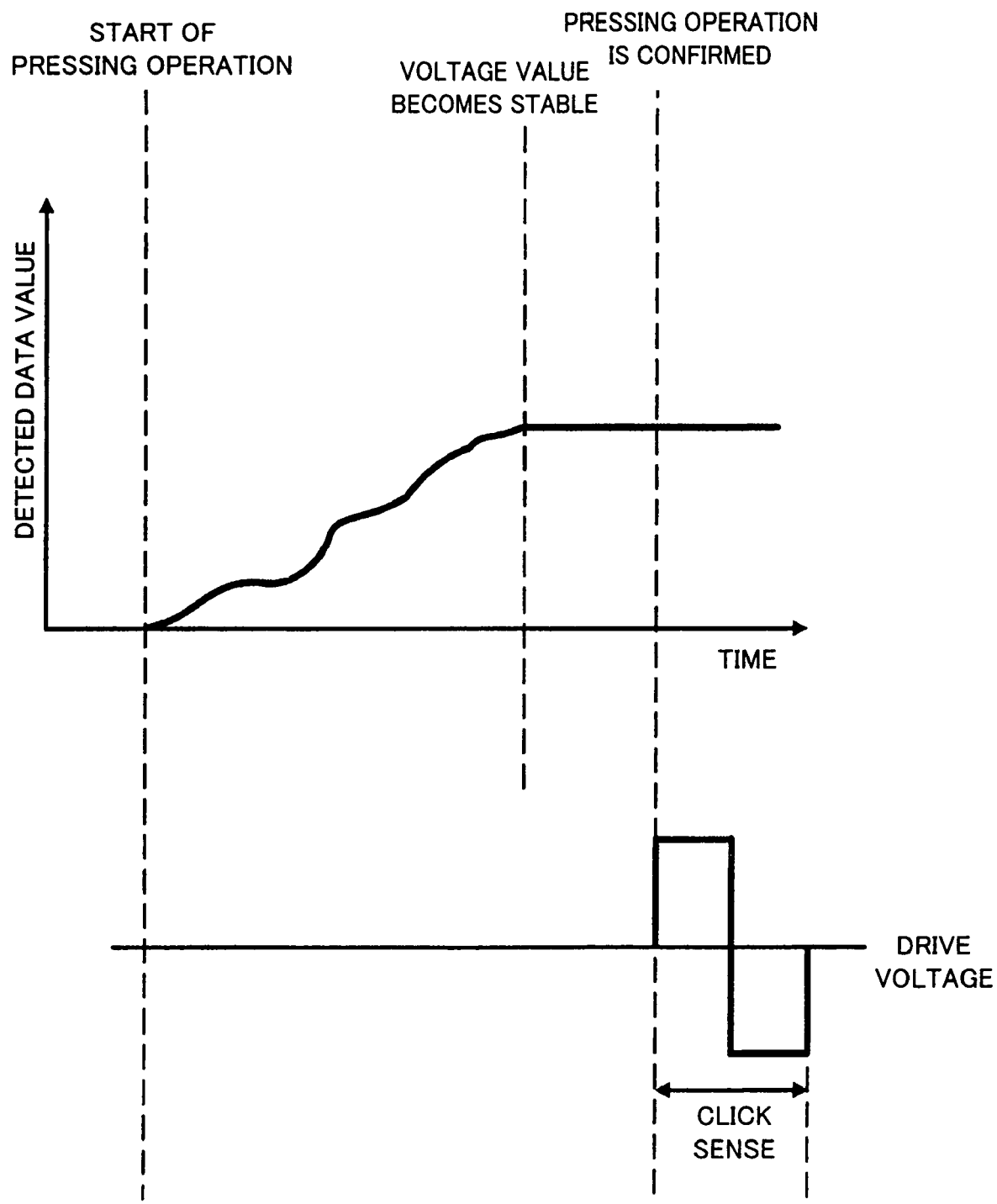
FIG. 9 shows graphs describing a relationship of a panel press period and a drive voltage of the piezoelectric actuator when the pressing operation is confirmed in a long time period.
Figure 10:
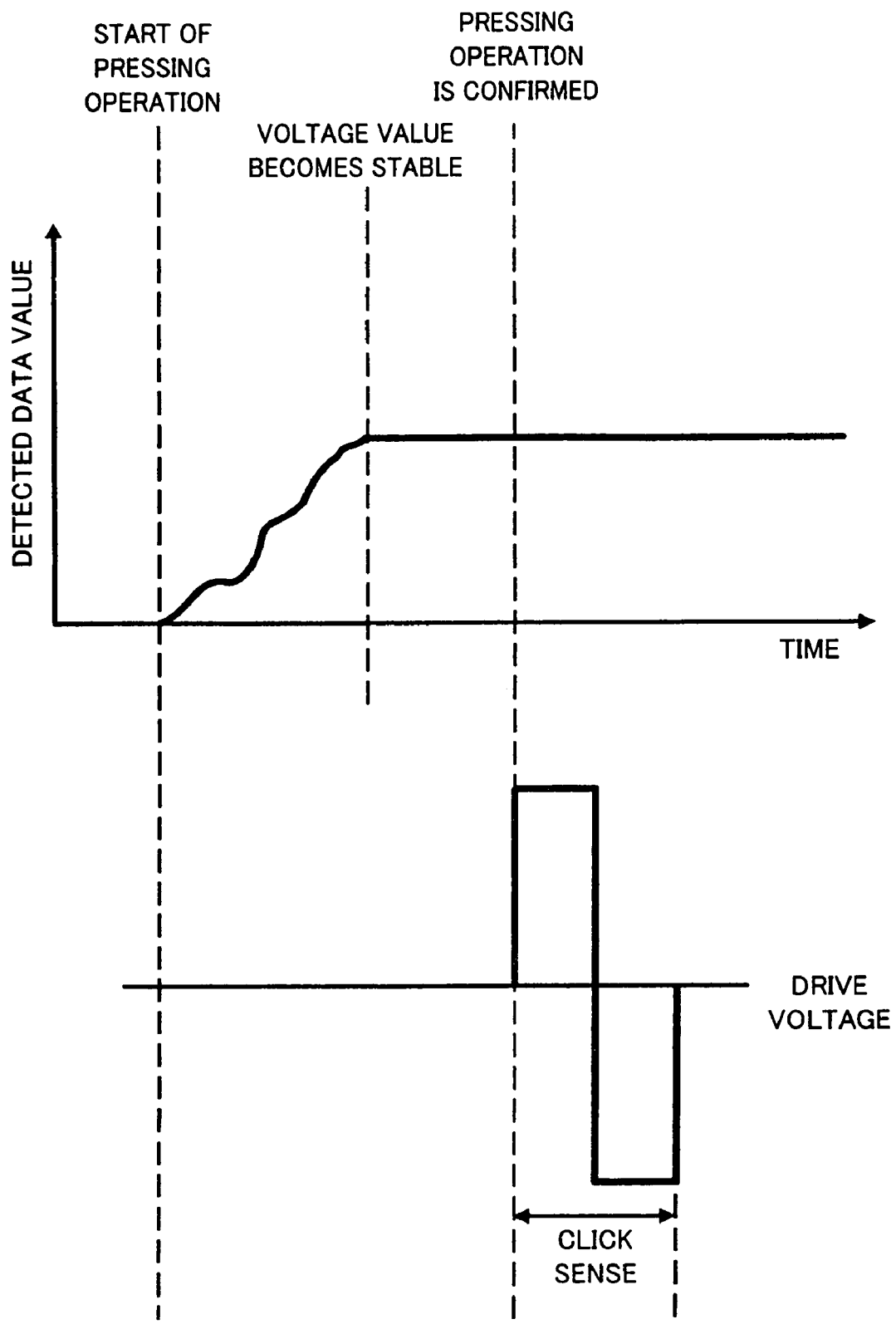
FIG. 10 shows graphs describing a relationship of a panel press period and a drive voltage of the piezoelectric actuator when the pressing operation is confirmed in a short time period.

FIG. 9 shows graphs describing a relationship of a panel press period and a drive voltage of the piezoelectric actuator when the pressing operation is confirmed in a long time period. FIG. 10 shows graphs describing the relationship of a panel press period and a drive voltage of the piezoelectric actuator when the pressing operation is confirmed in a short time period. In FIG. 9 and FIG. 10, an upper graph shows a relationship of a panel press period of the touch panel section 2 and a detected data value and the lower graph shows a signal waveform of a drive voltage supplied to the piezoelectric actuator 3. The upper graphs of FIG. 9 and FIG. 10 show a variation of a detected data value in the X direction.

As shown in the upper graphs of FIG. 9 and FIG. 10, before the front surface of the panel of the touch panel section 2 is pressed, the data value detected in the input operation is 0 or close to 0. When the front surface of the panel of the touch panel section 2 is continuously pressed, the detected data value gradually increases. When the front surface of the panel is kept pressed, the detected data value becomes stable. The input apparatus 100b supplies a drive voltage having a proper signal waveform to the piezoelectric actuator 3 corresponding to a time period from the press start time to the press confirmation time. As a result, the input apparatus 100b allows the operator to feel a click sense corresponding to the pressing operation.

In other words, when the time period after the pressing operation is started until the pressing operation is confirmed is long, namely it takes a long time period until the detected data value becomes stable, as shown in the lower graph of FIG. 9, after the pressing operation is confirmed, the input apparatus 100b supplies a small-amplitude AC square wave voltage having a predetermined frequency to the piezoelectric actuator 3 so that the piezoelectric actuator 3 and the touch panel section 2 finely vibrate. In contrast, when the time period after the pressing operation is started until the pressing operation is confirmed is short, namely the detected data value becomes stable in a short time period, as shown in the lower graph of FIG. 10, after the pressing operation is confirmed, the input apparatus 100b supplies a large-amplitude AC square wave voltage having a predetermined frequency to the piezoelectric actuator 3 so that the piezoelectric actuator 3 and the touch panel section 2 largely vibrate.

Figure 11:
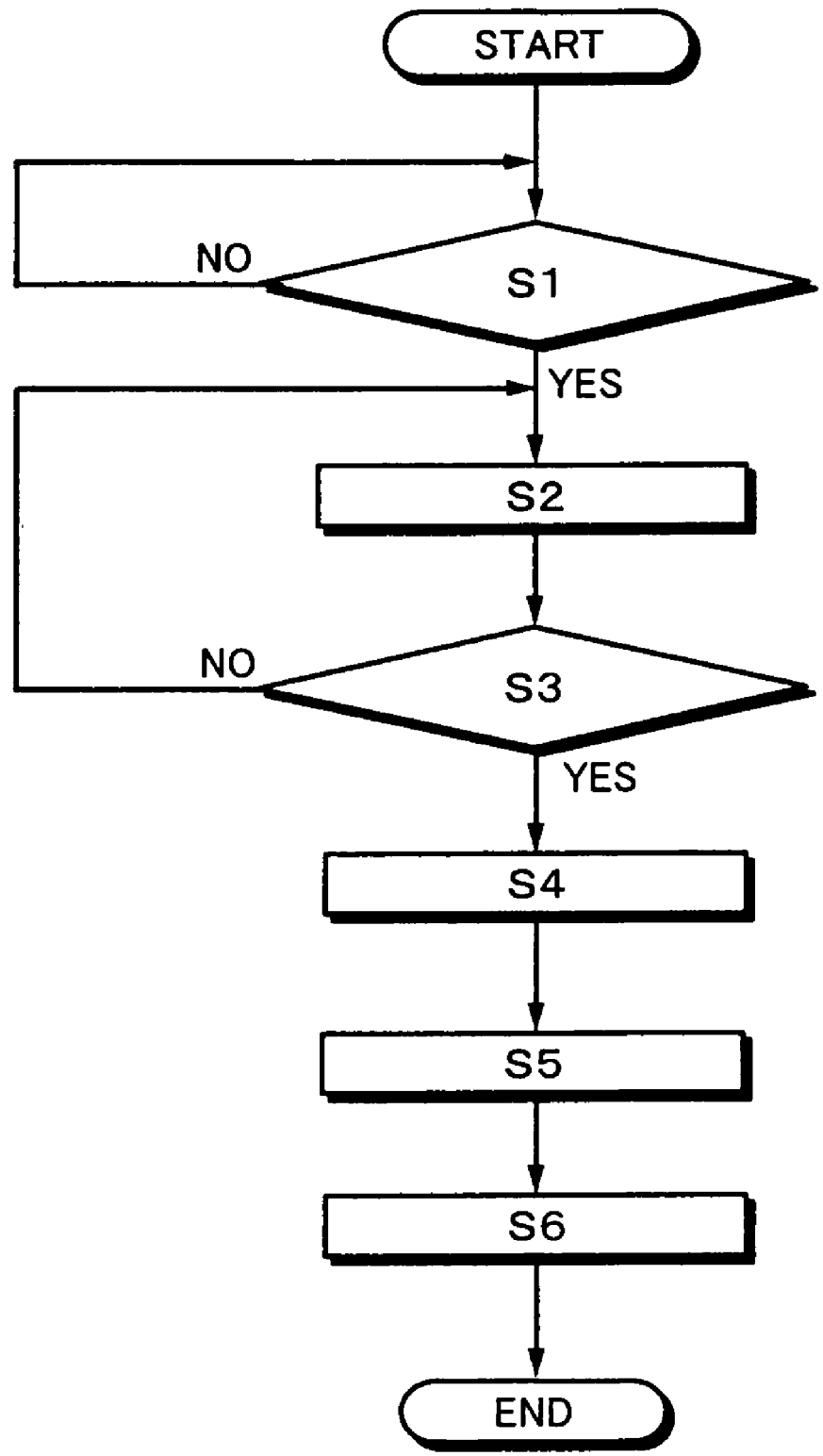
FIG. 11 is a flow chart showing a control of an input apparatus according to the second embodiment.

FIG. 11 is a flow chart showing a control of the input apparatus according to the second embodiment.

The input apparatus 100b, which vibrates the touch panel section 2 corresponding to the time period after the pressing operation is started until the pressing operation is confirmed, determines whether the operator is pressing the front surface of the panel corresponding to a change of the detected data value (at step S1).

When the determined result at step S1 denotes that the front surface of the panel is being touched, the input apparatus 100b starts measuring a time period as the press start time (at step S2).

Thereafter, the input apparatus 100b monitors the detected data value and determines whether the pressing operation is confirmed corresponding to the stable state of the detected data value (at step S3).

When the determined result at step S3 denotes that the pressing operation has been confirmed, the input apparatus 100b stops measuring the time period after the press start time (at step S4).

The input apparatus 100b decides a drive voltage corresponding to the measured time period obtained at step S4 (at step S5). The input apparatus 100b drives the piezoelectric actuator 3 with the drive voltage (at step S6). For example, the input apparatus 100b decides an amplitude of the signal waveform reversely proportional to the measured time period. The input apparatus 100b drives the piezoelectric actuator 3 with a drive voltage reversely proportional to the measured time period.

When the input apparatus 100b decides the drive voltage, the input apparatus 100b may compare the measured time period and a predetermined time period preset thereto and decide the drive voltage corresponding to the compared result. In other words, the input apparatus 100b drives the piezoelectric actuator 3 with a predetermined small drive voltage when the measured time period is larger than the predetermined time period. In contrast, when the measured time period is larger than the predetermined time period, the input apparatus 100b drives the piezoelectric actuator 3 with a predetermined large drive voltage.

When the determined result at step S1 denotes that the panel is not being touched, step 1 is repeated until the determined result denotes that the panel is being touched. When the determined result at step S3 denotes that the pressing operation has been confirmed, step S3 is repeated until the pressing operation has been confirmed.

In FIG. 9, FIG. 10, and FIG. 11, when it takes a long time period until the pressing operation has been confirmed, it means that the operator weakly performed the pressing operation. In contrast, when it takes a short time period until the pressing operation has been confirmed, it means that the operator strongly performed the pressing operation. In such a manner, the input apparatus 100b measures a time period after the pressing operation is started until the pressing operation is confirmed corresponding to the voltage value that varies after the pressing operation is started and correlates the strength of the pressing operation with the measured time period. The input apparatus 100b supplies a drive voltage having a signal waveform corresponding to the measured time period to the piezoelectric actuator 3 so that the operator feels a click sense corresponding to the touching operation.

In the examples shown in FIG. 9 and FIG. 10, an AC square wave voltage is supplied to the piezoelectric actuator 3. Of course, an AC sine wave voltage may be supplied to the piezoelectric actuator 3.

In the foregoing description, the resistive film type touch panel that has the resistive film type sensor section 111 is used as the touch panel section 2 of the input apparatus 100b. The touch panel section 2 may use various types of touch panels such as capacity type, optical type, ultrasonic type, electromagnetic induction type, or the like to cause the operator to feel a stroke sense and a click sense. In other words, as long as a sensor that detects any change in a signal (detected data value) detected after the input operation is started until the input operation is confirmed, any type of a sensor can be used.

When the touch panel section 2 is of the capacity type, a touching portion that the operator touches with his or her finger is formed of a transparent electroconductive panel. A circuit that applies a voltage and detects a current is disposed inside the frame (below an outer edge of the touching portion). A constant voltage is applied to the electroconductive panel. When the operator touches the touch panel of the input apparatus with his or her finger, the capacity of the panel varies. The varied capacity is detected as a current value.

When the touch panel section 2 is of the optical type, a touching portion is formed of a transparent panel made of glass, acrylic resin, or the like. A light emitting device such as an LED (Liquid Crystal Display) and a light receiving device are disposed inside the frame (below an outer edge and of the touching portion). The front surface of the touching portion is radiated with an infrared ray in a matrix shape. The infrared ray is received by the opposite light receiving device. When the operator touches the front surface of the panel of the input apparatus with his or her finger or the like, the infrared ray is blocked. The variation of the blocked infrared ray is detected as an electric signal.

When the touch panel section 2 is of the ultrasonic type, a touching portion is formed of a transparent panel. A transmitters and a receiver are disposed inside the frame (below an outer edge of the touching portion) so that they are opposite in the X and Y directions. An oscillator generates a surface acoustic wave on the front surface of the touching portion. When the operator touches his or her finger on the front surface of the touch panel of the input apparatus, the vibration of the touching portion is absorbed by the finger. As a result, a delay of the surface acoustic wave is detected.

When the touch panel section 2 is of the electromagnetic induction type, an input operation is performed with a pen type pointing device or the like that contains a circuit that generates a magnetic field on a touching portion formed of a transparent panel. Many sensor coils that detect the magnetic field are disposed as a sensor section on the rear side of the panel (on the rear side of the operation surface). When the operator touches the front surface of the touch panel with the pointing device, the sensor section detects a change of the magnetic field.

When one of these types is used, a flexible board that mounts a piezoelectric actuator is disposed between the frame of the panel as the touching portion and the frame of the liquid crystal display section. In any type, a signal that varies when the operator touches the front surface of the panel is detected. A signal waveform of a drive voltage supplied to the piezoelectric actuator is generated corresponding to a measured time period after the pressing operation is started until the pressing operation is confirmed. After the pressing operation is confirmed, the piezoelectric actuator is driven corresponding to the signal waveform to vibrate the panel.

As described above, in the touch panel type input apparatus according to the second embodiment of the present invention, the panel is vibrated corresponding to a time period after the input operation is started by pressing or touching the front surface of the panel until the input operation is confirmed. In other words, when the time period until the input operation is confirmed is long, assuming that the pressing operation on the front surface of the panel is weak, the panel is finely vibrated. In contrast, when the time period until the input operation is confirmed is short, assuming that the pressing operation on the front surface of the panel is strong, the panel is largely vibrated to cause the operator to unconsciously learn he or she can more weakly operate the panel.

As a result, the operator can naturally learn an optimum operation of the input apparatus. As a result, the operator does not need to operate the apparatus with an excessive force. Thus, fatigue of fingers and stress in the input operation are lightened. As a result, a more operator friendly user interface can be accomplished. The touch panel type input apparatus is an important interface section because an operator's impression about the entire system depends on the operability of the input apparatus. According to the present invention, the operability of the touch panel type input apparatus is improved. In addition, a person who is not accustomed to the input operation can safely operate it.

According to the first and second embodiments, the panel that the operator presses or touches with his or her finger or the like is vibrated by a piezoelectric actuator to accomplish a stroke sense and a click sense. Instead, any device may be used for the input apparatus as long as the device can vibrate the panel.

According to the first and second embodiments, when the panel is pressed or touched, the panel is controlled so that it causes the operator to feel a stroke sense and a click sense. In contrast, when the operator release his or her finger or the like from the panel, it may be controlled so that it causes him or her to feel a click sense and a stroke sense.

In addition, the foregoing input apparatus can be suitably used for an information process apparatus such as a personal computer (PC) and a portable information process apparatus such as a portable telephone or a PDA. In addition, the foregoing input apparatus can be used for any devices such as a broadcasting device such as a switcher device, a cash dispenser (CD) and an automatic teller machine (ATM) of banks, and a game device. In addition the foregoing input apparatus may be used for a remote control device that remotely controls one of these devices.

INDUSTRIAL UTILIZATION

The input apparatus according to the present invention can be applied to an input pad as a pointing device of an input operation section of a note type PC, a tablet device for drawing software, and an input apparatus that does not have an image display section.

DESCRIPTION OF REFERENCE NUMERALS

1 LIQUID CRYSTAL DISPLAY SECTION
1a DISPLAY PANEL
1b, 2b FRAME
2 TOUCH PANEL SECTION
2a PRESSING PORTION
3 PIEZOELECTRIC ACTUATOR
4 FLEXIBLE BOARD 31a, 31b WIRING TERMINAL
41 MOUNT PORTION
41a, 41b THROUGH-HOLE
41c CENTER SPACER PORTION
42a, 42b WIRING PATTERN
43a, 43b AREA
100, 10a, 101b INPUT APPARATUS
101, 111 SENSOR SECTION
102, 112 POSITION DETERMINATION PROCESS SECTION
103, 113 CONTROL SECTION
103a, 113a D/A CONVERSION SECTION
103b WAVEFORM CONTROL SECTION
103c, 113b DRIVER CIRCUIT
104, 114 DRIVE SECTION
S1 IS FRONT SURFACE OF PANEL BEING PRESSED?
S2 START COUNTING TIME PERIOD.
S3 HAS PRESSING OPERATION BEEN CONFIRMED?
S4 END OF TIME MEASUREMENT
S5 DECIDE DRIVE VOLTAGE CORRESPONDING TO MEASURED TIME PERIOD.
S6 DRIVE PIEZOELECTRIC ACTUATOR.

The invention claimed is:

1. An input apparatus for performing an input operation on a front surface of a panel, comprising:
    input detection means for detecting an input operation performed on the front surface of the panel, and for determining whether the input operation is a pressing operation or a touching operation by determining whether a signal from the panel becomes stable for at least a predetermined period of time, the signal from the panel being generated based on the input operation;
    waveform generation means for generating a first signal waveform having a first amplitude while the input detection means detects that the input operation is being performed, and generating a second signal waveform having a second amplitude which is larger than the first amplitude based on a determination by the input detection means that the signal from the panel has become stable for at least the predetermined period of time, thus indicating the input operation is the pressing operation; and
    panel deforming means for deforming the panel based on the signal waveforms generated by the waveform generation means.

2. The input apparatus as set forth in claim 1,
    wherein the first signal waveform generated by the waveform generation means has a higher frequency than the second signal waveform generated by the waveform generation means.

3. The input apparatus as set forth in claim 1,
    wherein the input detection means detects the signal from the input operation and the signal changes as the input operation is being performed on the front surface of the panel, and
    wherein the waveform generation means generates the first signal waveform after the signal from the input operation is detected by the input detection means and starts changing, and generates the second signal waveform after the signal from the input operation becomes stable so as to confirm the pressing operation.

4. The input apparatus as set forth in claim 1,
    wherein the waveform generation means varies the first signal waveform after the input operation is performed until the pressing operation is confirmed.

5. The input apparatus as set forth in claim 1,
    wherein when the input detection means detects that the input operation is being performed on a portion of the front surface of the panel where a pressing operation will not be recognized by the input detection means, the waveform generation means generates only the first signal waveform after the input operation is started until the pressing operation is confirmed.

6. An information process apparatus having an input apparatus for performing an input operation on a front surface of a panel, comprising:
    input detection means for detecting an input operation performed on the front surface of the panel, and for determining whether the input operation is a pressing operation or a touching operation by determining whether a signal from the panel becomes stable for at least a predetermined period of time, the signal from the panel being generated based on the input operation;
    waveform generation means for generating a first signal waveform having a first amplitude while the input detection means detects that the input operation is being performed, and generating a second signal waveform having a second amplitude which is larger than the first amplitude based on a determination by the input detection means that the signal from the panel has become stable for at least the predetermined period of time, thus indicating the input operation is the pressing operation; and
    panel deforming means for deforming the panel based on the signal waveforms generated by the waveform generation means.

7. A remote control apparatus having an input apparatus for performing an input operation on a front surface of a panel, comprising:
    input detection means for detecting an input operation performed on the front surface of the panel, and for determining whether the input operation is a pressing operation or a touching operation by determining whether a signal from the panel becomes stable for at least a predetermined period of time, the signal from the panel being generated based on the input operation;
    waveform generation means for generating a first signal waveform having a first amplitude while the input detection means detects that the input operation is being performed, and generating a second signal waveform having a second amplitude which is larger than the first amplitude based on a determination by the input detection means that the signal from the panel has become stable for at least the predetermined period of time, thus indicating the input operation is a pressing operation; and
    panel deforming means for deforming the panel based on the signal waveforms generated by the waveform generation means.

8. A control method of an input apparatus for performing an input operation on a front surface of a panel, the method comprising:
    detecting an input operation performed on the front surface of the panel;
    generating a signal from the panel based on the input operation;
    determining whether the input operation is a pressing operation or a touching operation by determining whether the signal from the panel becomes stable for at least a predetermined period of time;
    generating a first signal waveform having a first amplitude while the input operation is detected;

generating a second signal waveform having a second amplitude which is larger than the first amplitude based on a determination that the signal from the panel has become stable for at least the predetermined period of time, thus indicating the input operation is the pressing operation; and deforming the panel corresponding to the generated signal waveforms.

9. An input apparatus for performing an input operation on a front surface of a panel, comprising:

input detection means for detecting an input operation performed on the front surface of the panel, and for determining whether the input operation is a pressing operation or a touching operation by determining whether a signal from the panel becomes stable for at least a predetermined period of time, the signal from the panel being generated based on the input operation;

time period measurement means for measuring a time period starting at when the input operation is detected until a determination by the input detection means that the signal from the panel has become stable for at least the predetermined period of time, thus indicating the input operation is the pressing operation;

waveform generation means for generating a signal waveform having characteristics based on a length of the time period measured by the time period measurement means; and panel deforming means for deforming the panel corresponding to the signal waveform generated by the waveform generation means.

10. The input apparatus as set forth in claim 9, wherein the signal waveform generated by the waveform generation means has an amplitude reversely proportional to the length of time period measured by the time period measurement means.

11. The input apparatus as set forth in claim 9, wherein the signal waveform generated by the waveform generation means when the length of the time period measured by the time period measurement means is shorter than a predetermined length of time has an amplitude which is larger than an amplitude of the signal waveform generated by the waveform generation means when the length of the time period measured by the time period measurement means is longer than the predetermined length of time.

12. The input apparatus as set forth in claim 9, wherein the input detection means detects the signal from the input operation and the signal varies as the input operation is being performed on the front surface of the panel, and wherein the time period measurement means determines the pressing operation is being performed when the signal that varies while the input operation is performed becomes stable.

13. An information process apparatus having an input apparatus for performing an input operation on a front surface of a panel, comprising:

input detection means for detecting an input operation performed on the front surface of the panel, and for determining whether the input operation is a pressing operation or a touching operation by determining whether a signal from the panel becomes stable for at least a predetermined period of time, the signal from the panel being generated based on the input operation;

time period measurement means for measuring a time period starting at when the input operation is detected until a determination by the input detection means that the signal from the panel has become stable for at least the predetermined period of time, thus indicating the input operation is the pressing operation;

waveform generation means for generating a signal waveform having characteristics based on a length of the time period measured by the time period measurement means; and panel deforming means for deforming the panel corresponding to the signal waveform generated by the waveform generation means.

14. A remote control apparatus having an input apparatus for performing an input operation on a front surface of a panel, comprising:

input detection means for detecting an input operation performed on the front surface of the panel, and for determining whether the input operation is a pressing operation or a touching operation by determining whether a signal from the panel becomes stable for at least a predetermined period of time, the signal from the panel being generated based on the input operation;

time period measurement means for measuring a time period starting at when the input operation is detected until a determination by the input detection means that the signal from the panel has become stable for at least the predetermined period of time, thus indicating the input operation is the pressing operation;

waveform generation means for generating a signal waveform having characteristics based on a length of the time period measured by the time period measurement means; and panel deforming means for deforming the panel corresponding to the signal waveform generated by the waveform generation means.

15. A control method of an input apparatus for performing an input operation on a front surface of a panel, the method comprising:

detecting an input operation performed on the front surface of the panel;

generating a signal from the panel based on the input operation;

determining whether the input operation is a pressing operation or a touching operation by determining whether the signal from the panel becomes stable for at least a predetermined period of time;

measuring a time period starting at when the input operation is detected until a determination by the input detection means that the signal from the panel has become stable for at least the predetermined period of time, thus indicating the input operation is the pressing operation;

generating a signal waveform with a waveform generating unit, the signal waveform having characteristics based on a length of the measured time period; and deforming the panel corresponding to the signal waveform generated by the waveform generation unit.

16. The input apparatus as set forth in claim 3, wherein the signal from the input operation changes based on a change in a coordinate location of the input operation on the front surface of the panel and the signal from the input operation is stable if the coordinate location of the input operation on the front surface of the panel does not change.

17. The input apparatus as set forth in claim 9, wherein the waveform generation means generates another signal waveform while the time period measurement means measures the time period, and the panel deforming means deforms the panel corresponding to the another signal waveform until the time period has been measured, and then deforms the panel corresponding to the signal waveform based on the length of the measured time period after the time period has been measured.

18. The input apparatus as set forth in claim 12, wherein the signal from the input operation varies based on a change in a coordinate location of the input operation on the front surface of the panel and the signal from the input operation is stable if the coordinate location of the input operation on the front surface of the panel does not change.

* * * * *